US008057891B2

(12) United States Patent
Cheng et al.

(10) Patent No.: US 8,057,891 B2
(45) Date of Patent: Nov. 15, 2011

(54) REMOTE ACTIVATION OF THERMO-REVERSIBLE DRY ADHESIVES

(75) Inventors: Yang T. Cheng, Troy, MI (US); Tao Xie, Troy, MI (US); Xingcheng Xiao, Troy, MI (US); John C. Ulicny, Oxford, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 12/359,709

(22) Filed: Jan. 26, 2009

(65) Prior Publication Data

US 2010/0190011 A1 Jul. 29, 2010

(51) Int. Cl.
B32B 5/16 (2006.01)
B32B 18/00 (2006.01)
A41H 37/00 (2006.01)
G05G 15/00 (2006.01)

(52) U.S. Cl. .......... 428/323; 428/325; 428/326; 156/66; 156/350

(58) Field of Classification Search .................. 428/323, 428/325, 328; 156/66, 350
See application file for complete search history.

(56) References Cited

U.S. PATENT DOCUMENTS

| 5,755,913 | A | 5/1998 | Liaw et al. |
|---|---|---|---|
| 6,759,481 | B2 | 7/2004 | Tong |
| 6,773,535 | B1 | 8/2004 | Wetzel |
| 6,827,325 | B2 | 12/2004 | Hofmann et al. |
| 6,866,730 | B2 * | 3/2005 | Cheng et al. ............... 148/516 |
| 6,986,855 | B1 | 1/2006 | Hood et al. |
| 7,005,195 | B2 * | 2/2006 | Cheng et al. ............... 428/615 |
| 7,188,498 | B2 | 3/2007 | Browne et al. |
| 7,905,538 | B2 * | 3/2011 | Ukpai et al. ............... 296/146.9 |
| 2001/0047579 | A1 | 12/2001 | Lee et al. |
| 2005/0151385 | A1 | 7/2005 | Autumn et al. |
| 2005/0167556 | A1 | 8/2005 | Fontana et al. |
| 2005/0240190 | A1 | 10/2005 | Gall et al. |
| 2005/0274455 | A1 | 12/2005 | Extrand |
| 2006/0036045 | A1 | 2/2006 | Wilson et al. |
| 2006/0156535 | A1 | 7/2006 | Browne et al. |
| 2007/0073130 | A1 | 3/2007 | Finch et al. |
| 2007/0289786 | A1 | 12/2007 | Cutkosky et al. |

OTHER PUBLICATIONS

Crystallization of Liquid DGEBPA and DGEBPF Epoxy Resins; Resolution Performance Products product bulletin; SC:2365-01; Jul. 2001; 3 pages.
Jeffamine D-230 Polyetheramine; Huntsman Corporation technical bulletin; Copyright 2006; 2 pages.
Gall et al., Internal Stress Storage in Shape Memory Polymer Nanocomposites; Applied Physics Letter; Jul. 12, 2004; pp. 290-292; vol. 85; No. 2.
Xu et al., Synthesis and Shape Memory Effects of Si-O-Si Cross-Linked Hybrid Polyurethanes; Polymer; 2006; pp. 457-465; vol. 47.
Lee et al., A Reversible Wet/Dry Adhesive Inspired by Mussels and Geckos; Nature; Jul. 19, 2007; pp. 338-342; vol. 448.
Lee et al., Single-Molecule Mechanics of Mussel Adhesion; PNAS; Aug. 29, 2005; 12999-13003; vol. 103; No. 35.
Veriflex Shape Memory Polymer; CRG Technology—Veriflex; http://www.crgrp.net/veriflex.shtml; Cornerstone Research Group, Inc., printed Aug. 14, 2007; 2 pages.
Shape Memory Polymer; CRG Technology—Veriflex; http://www.crgn.net/success-stories.shtml; Cornerstone Research Group, Inc.; printed Aug. 14, 2007; 4 pages.
TEMBO Shape Memory Polymers and Elastic Memory Polymers and Elastic Memory Composite (EMC) Material; CTD: Elastic Memory Composite (EMC) Material; http:www.ctd-materials.com/products/emc.htm; Cornerstone Research Group, Inc.; printed Aug. 14, 2007; 3 pages.
Nelson et al., Shape Recovery of Nanoscale Imprints in a Thermoset "Shape Memory" Polymer, Applied Physics Letters; 86; 103108-1-3; 2005.
Lendlein et al., Shape-Memory Polymers; Angewandte Chem. Int. Ed; 2002; pp. 2034-2057; vol. 41.
Xie et al., Self-Peeling Reversible Dry Adhesive System; Chem. Mater.; 2008; pp. 2866-2868; vol. 20.
Liu et al., Chemically Cross-Linked Polycyclooctene: Synthesis, Characterization and Shape Memory Behavior; Macromolecules; 2002; pp. 9868-9874; vol. 35.
Lendlein et al., Biodegradable, Elastic Shape-Memory Polymers for Potential Biomedical Applications; Science; May 31, 2002; pp. 1673-1676; vol. 296.
Lee et al., Structure and Thermomechanical Properties of Polyurethane Block Copolymers with Shape Memory Effect; Macromolecules; 2001; pp. 6431-6437; vol. 34.
Lin et al., Study on Shape-Memory Behavior of Polyether-Based Polyurethanes. I. Influence of the Hard-Segment Content; J. of Applied Polymer Science; 1998; pp. 1563-1574; V. 69.
Lin et al., Study on Shape-Memory Behavior of Polyether-Based Polyurethanes. II. Influence of Soft-Segment Molecular Weight; J. of App. Polymer Science; 1998; pp. 1575-1586; V. 69.
EPON Resin 828; Shell Chemical—Online Literature; Shell Chemicals Reference Manual; http://www2.shellchemical.com/CMM/WEB/GLOBCH...NSFLiterature...printed Oct. 10, 1999; 8 pages.
Gall et al., Shape Memory Polymer Nanocomosites; Acta Materialia; 2002; pp. 5115-5126; vol. 50.
Behl et al., Shape-Memory Polymers: Dual Shape Materials for Bio-medical Applications; A. Mater. Today; 2007; vol. 10; pp. 1-20.
Bellin et al., Polymeric Triple-Shape Materials; PNAS; Nov. 28, 2006; vol. 103; No. 48; pp. 18043-18047.
Chung et al., Two-Way Reversible Shape Memory in a Semicrystalline Network; Macromolecules; 2008; vol. 41; pp. 184-192.

(Continued)

Primary Examiner — Nathan M Nutter
(74) Attorney, Agent, or Firm — Reising Ethington P.C.

(57) ABSTRACT

A thermo-reversible dry adhesive, having shape memory polymer characteristics, introduces one or more particles of micro- or nano-particles to at least one layer of the at least one layer of shape memory polymer. These particles may be remotely activated to induct heat sufficient to transform the dry adhesive material from its temporary shape to its permanent shape in the absence of load, which allows the dry adhesive to be reversibly coupled to one or more substrates, wherein the degree of adhesion is greater when the dry adhesive is in the temporary shape than in the permanent shape.

20 Claims, 1 Drawing Sheet

OTHER PUBLICATIONS

Rousseau et al., Shape Memory Effect Exhibited by Smectic-C Liquid Crystalline Elastomers; J. Am. Chem. Soc.; 2003; vol. 125; pp. 15300-15301.

Liu et al., Review of Progress in Shape-Memory Polymers; Journal of Materials Chemistry; 2007; vol. 17; pp. 1543-1558.

Dietsch et al., A Review—Features and Benefits of Shape Memory Polymers (SMPs); Journal of Advanced Materials; Apr. 2007; vol. 39; No. 2; pp. 3-12.

Li et al., Shape Memory Effect of Ethylene—Vinyl Acetate Copolymers; Journal of Applied Polymer Science; 1999; vol. 71; pp. 1063-1070.

Liu et al., Novel Shape-Memory Polymer with Two Transition Temperatures; Macromol. Rapid Commun.; 2005; vol. 26; pp. 649-652.

Reyntjens et al., Polymer Networks Containing Crystallizable Poly(octadecyl vinyl ether) Segments for Shape-Memory Materials; Macromol. Rapid. Commun.; 1999; vol. 20; pp. 251-255.

Jiang et al., Polymers Move in Response to Light; Advanced Materials; 2006; vol. 18; pp. 1471-1475.

Daltorio et al., A Small Wall-Walking Robot with Compliant, Adhesive Feet; IEEE/RSJ International Conference on Intelligent Robots and Systems; 2005; pp. 4018-4023.

International Search Report and Written Opinion; PCT/US2008/060826; Mailed Jun. 30, 2008; 9 pages.

Xie et al., Self-Peeling Reversible Dry Adhesive System; Chem. Mater. 2008; vol. 20; pp. 2866-2868.

Aubert et al., Thermally Removable Epoxy Adhesives Incorporating Thermally Reversible Diels-Alder Adducts; The Journal of Adhesion; 2003; vol. 79; pp. 609-616.

International Search Report and Written Opinion; PCT/US2008/060796; Mailed Jun. 30, 2008; 8 pages.

Xiao; U.S. Appl. No. 12/273,083; Self-Healing and Scratch Resistant Shape Memory Polymer System; filed Nov. 18, 2008.

Xie; U.S. Appl. No. 11/867,531; Reversible Dry Adhesives; filed Oct. 4, 2007.

Xie; U.S. Appl. No. 12/396,045; Polymer Systems with Multiple Shape Memory Effect; filed Mar. 2, 2009.

Xie; U.S. Appl. No. 12/367,826; A Reversible Welding Process for Polymers; filed Feb. 9, 2009.

Xie; U.S. Appl. No. 12/178,844; High Strength Reversible Noncovalent Adhesion Methods for a Solid Polymer-Polymer Interface; filed Jul. 24, 2008.

Cheng; U.S. Appl. No. 12/359,709; Remote Activation of Thermo-Reversible Dry Adhesives; filed Jan. 26, 2009.

Xie; U.S. Appl. No. 12/423,947; Shape Memory Polymer and Adhesive Combination and Methods of Making and Using the Same, filed Apr. 15, 2009.

Xie; U.S. Appl. No. 12/432,211; Shape Memory Polymers with Surface having Dangling Adhesive Polymeric Chains and Methods of Making and Using the Same; filed Apr. 29, 2009.

Xie; U.S. Appl. No. 12/181,562; Polymer Systems with Multiple Shape Memory Effect; filed Jul. 29, 2008.

Xie; U.S. Appl. No. 11/867,549; Method of Minimizing Residue Adhesion for Thermo-Reversible Dry Adhesives; filed Oct. 4, 2007.

Xie; U.S. Appl. No. 12/105,865; Attachment Pad with Thermal Reversible Adhesive and Methods of Making and Using the Same; filed Apr. 18, 2008.

Xie; U.S. Appl. No. 11/867,558; Multilayer Adhesive for Thermal Reversible Joining of Substrates; filed Oct. 4, 2007.

Xie; U.S. Appl. No. 12/391,704; Reversible Dry Adhesives for Wet and Dry Conditions; filed Feb. 24, 2009.

Xie; U.S. Appl. No. 12/105,749; Method for Robotic Handling Using Thermo-Reversible Dry Adhesives; filed Apr. 18, 2008.

Xie; U.S. Appl. No. 12/105,788; Climbing Devices Based on Thermo-Reversible Dry Adhesives; filed Apr. 18, 2008.

* cited by examiner

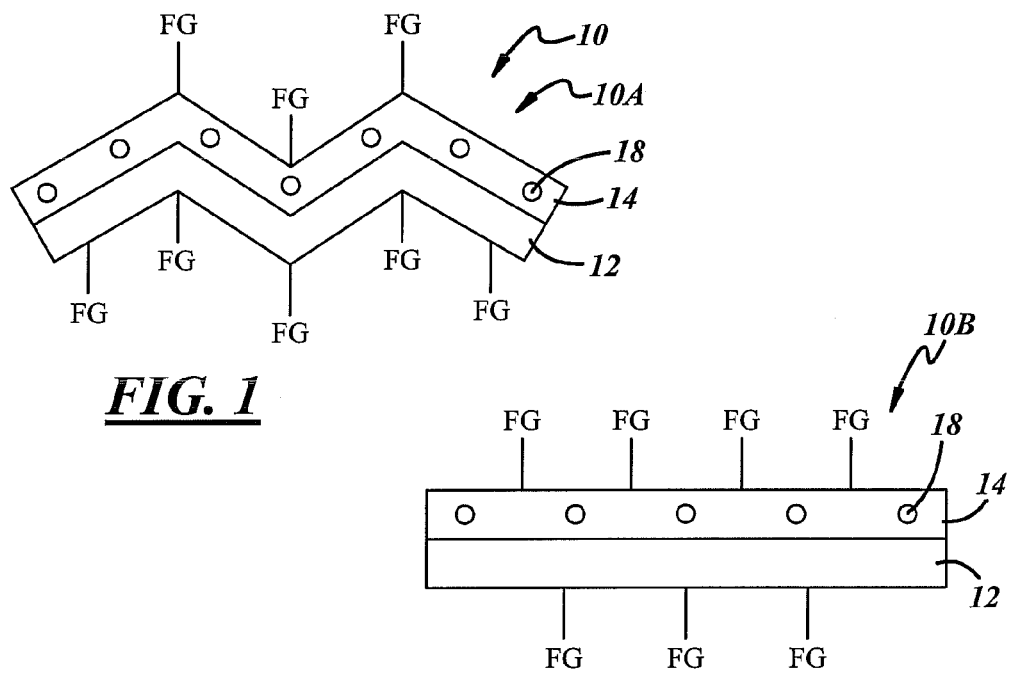
FIG. 1
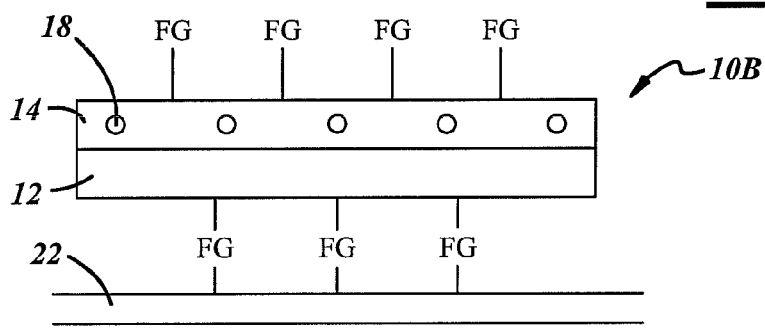
FIG. 2
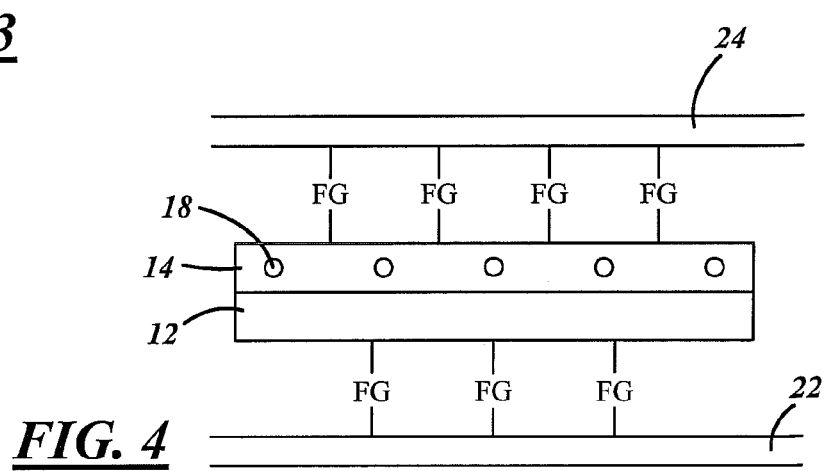
FIG. 3
FIG. 4

REMOTE ACTIVATION OF THERMO-REVERSIBLE DRY ADHESIVES

TECHNICAL FIELD

The technical field generally relates to polymer adhesives and more specifically to thermo-reversible dry adhesives that may be remotely activated.

BACKGROUND

Thermo-reversible dry adhesives are made of at least one layer of an elastomeric dry-adhesive and at least one layer of a shape memory polymer (SMPs). SMPs represent responsive polymers that can fix to deformed temporary shapes and recover to their permanent (original) shapes only upon external stimuli such as heating. By heating and imposing a load during subsequent cooling to transform the dry adhesive to a temporary shape, adhesive strength may be increased. By subsequently heating the dry adhesive in the absence of load, therein transforming the dry adhesive back to its permanent shape, adhesive strength may be decreased. These dry adhesives may thus be used to reversibly couple together substrate materials.

SUMMARY OF EXEMPLARY EMBODIMENTS

One embodiment includes a thermo-reversible dry adhesive material, having shape memory polymer characteristics, introduces one or more particles of micro- or nano-particles to at least one layer of the at least one layer of shape memory polymer. These particles may be remotely activated to induct heat sufficient to aid in transforming the dry adhesive material from its temporary shape to its permanent shape, or form its permanent shape to its temporary shape, to be coupled or uncoupled from a substrate material.

In one exemplary embodiment, the thermo-reversibly dry adhesive material may be formed by mixing one or more electrically conductive particles of micro- or nano-meter diameter are mixed into at least one layer of the shape memory polymer. When eddy currents are applied to the electrically conductive particles, heat is generated that may aid in transforming the dry adhesive between its temporary shape and its permanent shape.

Another exemplary embodiment discloses a thermo-reversible dry adhesive material in which magnetic particles of micro- or nano-meter diameter are mixed into at least one layer of the shape memory polymer. Magnetic hysteresis heating is the result of energy absorption that results due to friction of magnetic micro-volumes or domains with the shape memory polymer rotate to align themselves with the periodic re-orientation of the external magnetic field that may aid in transforming the dry adhesive between its temporary shape and its permanent shape.

Thus, the exemplary embodiments may allow the dry adhesive to be remotely activated by inductive heating (through the use electricity or magnetism), as opposed to directly heating the dry adhesive in an oven or similar heating device, to transform the dry adhesive.

Such a remote mechanism may be desirable for use in systems wherein direct heating to return the dry adhesive to its permanent shape may be problematic, costly or may adversely affect the substrates to which the dry adhesive has been previously applied.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 is a dry adhesive material according to one exemplary embodiment having a shape memory polymer;

FIG. 2 is the dry adhesive material of FIG. 1 transformed from its permanent shape to a temporary shape;

FIG. 3 is the dry adhesive material of FIG. 2 coupled to a substrate material; and FIG. 4 is the dry adhesive material of FIG. 2 coupled between two substrate materials.

DETAILED DESCRIPTION OF EXEMPLARY EMBODIMENTS

The following description of the embodiment(s) is merely exemplary (illustrative) in nature and is in no way intended to limit the invention, its application, or uses.

Shape memory polymers (SMPs) represent responsive polymers that can fix to deformed temporary shapes and recover to their permanent (original) shapes only upon external stimuli. SMPs may be available exhibiting a dual shape memory effect (DSME), wherein the SMP can only memorize one temporary shape in addition to its permanent shape in each shape memory cycle. It is also contemplated that SMPs may be available exhibiting a triple shape memory effect (TSME) or greater, wherein the SMP can memorize two distinct temporary shapes (for a TSME) or more in addition to its permanent shape in each memory cycle.

In general, to transform an SMP from its permanent shape to its temporary shape, the permanent shape may be heated to a first elevated temperature and then deformed under stress to yield the first temporary shape, a shape which may be different in visual appearance from the permanent shape. By definition, the first elevated temperature is a temperature sufficiently high to ensure a phase transition of the SMP (i.e. is a temperature above the glass transition temperature ($T_g$) of SMP). The SMP may then be cooled under stress to a temperature below the glass transition temperature of one SMP, wherein the stress may be relieved while maintaining the first temporary shape. To recover the permanent shape from the first temporary shape, the SMP may be reheated to the first elevated temperature in the absence of stress.

An exemplary embodiment creates a dry adhesive including at least one layer of a shape memory polymer (SMP) that takes advantage of the SMP's ability to transform between its permanent shape and a temporary shape and further allows remote activation of the SMP adhesive material (i.e. not through direct heating of the entire dry adhesive) to actuate such a transformation.

This remote activation may be particularly desirable when direct heating is not readily available, or inconvenient, or costly. This remote activation may also be particularly desirable for the subsequent removal of a previously applied dry adhesive to one or more substrate materials.

In one exemplary embodiment of the present invention, as shown in FIGS. 1 and 2, the dry adhesive 10 may include at least one layer of an elastomeric adhesive material 12 and one or more layers of a shape memory polymer material 14. At least one layer of the one or more layers of the shape memory polymer material 14 may include particles 18 of micro- or nano-meter diameter. The dry adhesive 10 may also include one or more functional groups FG that form a portion of either the adhesive material 12 or the shape memory polymer material 14, or both.

In order to utilize the shape memory properties of the dry adhesive 10, the dry adhesive 10 may be hot-pressed under a load and cooled under load. The hot pressing process may transform the layers of the shape memory polymer 14 from its permanent shape to its temporary shape. In conjunction therewith, this transforms the dry adhesive 10 from its permanent shape 10A, as shown in FIG. 1, to its temporary shape 10B, as shown in FIG. 2.

In its temporary shape 10B, any functional groups FG located on the surface portion of the dry adhesive 10, in either the elastomeric layer 12 or the shape memory polymer layer 14, may be more accessible for interaction to a single substrate material 22, as shown in FIG. 3, or individually to one or both of the two substrate materials 22 and 24, as shown in FIG. 4. This may allow for increased adhesion of the dry adhesive to the substrate materials 22, 24 in the temporary shape 10B than in the permanent shape 10A.

The functional groups FG may interact with the substrate materials 22, 24 to create increased reversible adhesion from a number of different non-covalent bonding adhesion mechanisms. While FIGS. 3 and 4 illustrate lines between FG and the substrate 22 or 24 that are typically associated with covalent bonds, the lines illustrated are merely illustrative of non-covalent bonding adhesion interaction between the functional group FG and respective substrate 22, 24 and are not intended to represent chemical bonding therebetween. A non-exhaustive list of potential non-covalent bonding adhesion mechanisms that may be contributed by the functional groups FG being brought into closer proximity to the respective substrate 22 or 24 include hydrogen bonding, acid-base interaction, ionic bonding, aromatic interaction (or π-π interaction), van der Waal forces, increased dry adhesive surface roughness, or combinations of two or more of these non-covalent bonding adhesion mechanisms.

The introduction of the particles 18 may provide a different method for transforming the shape memory polymer layer 14, and hence the dry adhesive 10, from the temporary shape 10B back to the permanent shape 10A that does not require the direct heating of the entire dry adhesive 10, and any coupled substrate 22 or 22, 24, above the $T_g$ of the shape memory layer or layers 14. In the exemplary embodiments provided herein, the particles 18 may be capable of being remotely activated to enable inductive heating of the shape memory polymer material 14 sufficient to transform, or aid in transforming, the dry adhesive 10 from its temporary shape (shown as 10B in FIG. 2 below) to its permanent shape 10A. This, in turn, may increase the distance between the functional groups FG and the respective substrate 22 or 24, and hence decreases the amount of interaction between the functional groups FG and the respective substrate 22 or 24, which allows the dry adhesive 10 to be easily uncoupled from the respective substrate 22 or 24.

In one exemplary embodiment, the particles 18 may be electrically conductive particles of micro- or nano-meter diameter that are mixed into one or more layers of the shape memory polymer 14. When eddy currents are applied to the electrically conductive particles 18, heat is generated that may aid in transforming, or alone be sufficient to transform, the dry adhesive 10 from its permanent shape 10A to its temporary shape 10B for increased adhesion to a substrate 22 or substrates, 22, 24, or from its temporary shape 10B to its permanent shape 10A for subsequent removal from a substrate 22 or substrates 22, 24. Examples of electrically conductive particles that may be used include ceramic particles, ceramic wires, metallic particles and metallic wires.

Another exemplary embodiment discloses a thermo-reversible dry adhesive material in which the particles 18 may be magnetic particles of micro- or nano-meter diameter that are mixed into the shape memory polymer 14. Magnetic hysteresis heating is the result of energy absorption that results due to friction of magnetic micro-volumes or domains with the shape memory polymer 14 rotate to align themselves with the periodic re-orientation of the external magnetic field that may aid in transforming, or alone be sufficient to transform the dry adhesive 10 from its permanent shape 10A to its temporary shape for increased adhesion to a substrate 22 or substrates 22, 24, or from its temporary shape 10B to its permanent shape 10A for subsequent removal from a substrate 22 or substrates 22, 24. Examples of magnetic particles that may be used include metallic particles.

In another exemplary embodiment, a combination of electrically conductive and magnetic particles may be used as the particles 18. Also, some of the particles 18 may function as both electrically conductive and magnetic particles, including particular metal particles, and thus may be activated remotely by two separate mechanisms.

Exemplary embodiments of shape memory polymer 14 materials include, but are not limited to epoxy polymers, polyurethanes or polyacrylates.

Exemplary embodiments of electrically conductive or magnetic particles 18 include, but are not limited to, organic materials, metallic materials, or ceramic materials. Specific exemplary embodiments include copper, iron, or $Fe_3O_4$.

The substrate materials 22 and 24 may be formed of the same material or separate materials. Non-limiting examples of substrate materials 22 and 24 include glass substrates, polymer substrates, metal substrates and other non-metal substrates.

By increasing the likelihood of such interaction with the substrate 22 or 24, which occurs when the adhesive material 10 is transformed to the temporary state 10B and the functional groups are moved such that there is more possible interaction with the substrate 22 or 24, the adhesive strength may be increased as compared with when the adhesive material 10 is in its permanent state 10A.

Example

Weighted copper nanoparticles (electrically conductive) were added into Jeffamine D-230 and the mixture was sonicated for 30 minutes. EPON 826 (a bisphenol A-type epoxy resin pre-melted at 75 degrees Celsius for 15 minutes), NGDE (a flexible polyether-type epoxy), and Jeffamine D-230 (a polyether diamine) (with copper particles) at a mole ratio of 1.6/0.4/1 were introduced into a glass vial, which was shaken vigorously by hand for about ten seconds to mix the components. The mixture was poured into an aluminum mold, cured at 100 degrees Celsius for 1 hour, and postcured at 130 degrees Celsius for 1 hour to yield the composite shape memory polymer (SMP). Based on this process, composite samples with weight percentages of copper content from 1% to 90% can be produced. Alternatively, magnetic field responsive particles such as $Fe_3O_4$ may replace the copper particles in the formulation to result in magnetically responsive SMP.

The above description of embodiments of the invention is merely exemplary in nature and, thus, variations thereof are not to be regarded as a departure from the spirit and scope of the invention.

What is claimed is:

1. A dry adhesive material capable of transformation between a permanent shape and a temporary shape, the dry adhesive material comprising:
   at least one layer of an elastomeric material; and
   at least one layer of a shape memory polymer material, where at least one layer of said shape memory polymer material includes one or more particles of micro- or nano-meter diameter, said one or more particles capable of being remotely activated to induct heat sufficient to transform the dry adhesive material between the permanent shape and the temporary shape.

2. The adhesive material of claim 1, wherein said one or more particles comprises one or more electrically conductive particles.

3. The adhesive material of claim 2, wherein said one or more electrically conductive particles comprises one or more ceramic particles.

4. The adhesive material of claim 2, wherein said one or more electrically conductive particles comprises one or more metallic particles.

5. The adhesive material of claim 1, wherein said one or more particles comprises one or more magnetic particles.

6. A method comprising:
   providing a first substrate;
   forming at least one layer of an elastomeric material;
   forming at least one layer of a shape memory polymer, wherein at least one layer of said shape memory polymer material includes one or more particles of micro- or nano-meter diameter;
   coupling said at least one layer of said elastomeric material to said at least one layer of said shape memory polymer to form a dry adhesive, said dry adhesive transformable from a permanent shape to a temporary shape;
   transforming said dry adhesive from said permanent shape to said temporary shape in the presence of a load;
   removing said load;
   coupling said first substrate to said dry adhesive in said temporary shape;
   remotely activating said one or more particles to induce heat sufficient to transform said dry adhesive from temporary shape to said permanent shape; and
   uncoupling said first substrate from said dry adhesive.

7. The method of claim 6, wherein forming at least one layer of a shape memory polymer comprises:
   admixing one or more electrically conductive particles of micro- or nano-meter diameter with a shape memory polymer material.

8. The method of claim 7, wherein remotely activating said one or more particles comprises:
   applying eddy currents from an outside source to said one or more electrically conductive particles to induce heat sufficient to transform said dry adhesive from said temporary shape to said permanent shape.

9. The method of claim 6, wherein forming at least one layer of a shape memory polymer comprises:
   admixing one or more magnetic particles of micro- or nano-meter diameter with a shape memory polymer material.

10. The method of claim 9, wherein remotely activating said one or more particles comprises:
    applying a magnetic field from an outside magnetic source to said one or more magnetic particles to induce heat sufficient to transform said dry adhesive from said temporary shape to said permanent shape.

11. The method of claim 10, wherein the application of said magnetic field induces said one or more magnetic particles to align with said shape memory polymer material, wherein alignment causes friction within said shape memory polymer material sufficient to raise the temperature of said shape memory polymer material above a glass transition temperature of said shape memory polymer material.

12. The method of claim 6 further comprising:
    providing a second substrate;
    coupling said dry adhesive in said temporary form to said second substrate such that said dry adhesive is located between said first substrate and said second substrate; and
    uncoupling said second substrate from said dry adhesive in said permanent shape after uncoupling said first substrate from said dry adhesive.

13. The method of claim 6, wherein transforming said dry adhesive from said permanent shape to said temporary shape in the presence of a load comprises:
    transforming said dry adhesive from said permanent shape to said temporary shape by heating said dry adhesive to a first temperature under a load, said first temperature being above the glass transition temperature of said shape memory polymer;
    cooling said dry adhesive in said temporary shape below said first temperature; and
    removing said load.

14. A method comprising:
    providing a first substrate;
    forming at least one layer of an elastomeric material;
    forming at least one layer of a shape memory polymer, wherein at least one layer of said shape memory polymer material includes one or more particles of micro- or nano-meter diameter;
    coupling said at least one layer of said elastomeric material to said at least one layer of said shape memory polymer to form a dry adhesive, said dry adhesive transformable from a permanent shape to a temporary shape;
    remotely activating said one or more particles to induce heat sufficient to transform said dry adhesive from said permanent shape to said temporary shape in the presence of a load;
    removing said load; and
    coupling said first substrate to said dry adhesive in said temporary shape.

15. The method of claim 14 further comprising:
    remotely activating said one or more particles to induce heat sufficient to transform said dry adhesive from temporary shape to said permanent shape; and
    uncoupling said first substrate from said dry adhesive.

16. The method of claim 14 further comprising:
    providing a second substrate; and
    coupling said second substrate to said dry adhesive in said temporary shape such that said dry adhesive is located between said first substrate and said second substrate.

17. The method of claim 14, wherein forming at least one layer of a shape memory polymer comprises:

admixing one or more electrically conductive particles of micro- or nano-meter diameter with a shape memory polymer material.

18. The method of claim 17, wherein remotely activating said one or more particles comprises:
applying eddy currents from an outside source to said one or more electrically conductive particles to induce heat sufficient to transform said dry adhesive from said temporary shape to said permanent shape.

19. The method of claim 14, wherein forming at least one layer of a shape memory polymer comprises:

admixing one or more magnetic particles of micro- or nano-meter diameter with a shape memory polymer material.

20. The method of claim 19, wherein remotely activating said one or more particles comprises:
applying a magnetic field from an outside magnetic source to said one or more magnetic particles to induce heat sufficient to transform said dry adhesive from said temporary shape to said permanent shape.

* * * * *